(12) United States Patent
Bucossi et al.

(10) Patent No.: US 7,295,044 B2
(45) Date of Patent: Nov. 13, 2007

(54) RECEIVER CIRCUITS FOR GENERATING DIGITAL CLOCK SIGNALS

(75) Inventors: William L. Bucossi, Burlington, VT (US); Hongfei Wu, Colchester, VT (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 11/275,537

(22) Filed: Jan. 12, 2006

(65) Prior Publication Data

US 2007/0159225 A1 Jul. 12, 2007

(51) Int. Cl.
*H03K 5/22* (2006.01)

(52) U.S. Cl. .......................... 327/65; 327/70; 327/291

(58) Field of Classification Search ................ 327/291, 327/298, 299, 65, 69, 70
See application file for complete search history.

(56) References Cited

U.S. PATENT DOCUMENTS

| | | | | |
|---|---|---|---|---|
| 5,367,204 A * | 11/1994 | Mattison | ...................... | 327/75 |
| 6,288,577 B1 * | 9/2001 | Wong | ........................... | 327/65 |
| 6,320,406 B1 * | 11/2001 | Morgan et al. | ............... | 326/14 |
| 6,650,149 B1 * | 11/2003 | Wong | ........................... | 327/65 |
| 6,753,701 B2 * | 6/2004 | Chang | .......................... | 326/93 |
| 6,791,369 B1 * | 9/2004 | Hattori | ........................ | 327/52 |
| 6,898,724 B2 * | 5/2005 | Chang | ......................... | 713/500 |
| 6,989,695 B2 * | 1/2006 | Dike et al. | .................. | 327/142 |
| 7,061,296 B2 * | 6/2006 | Friedrich et al. | ........... | 327/299 |

* cited by examiner

*Primary Examiner*—Kenneth B. Wells
*Assistant Examiner*—Hai L. Nguyen
(74) *Attorney, Agent, or Firm*—Shmeiser, Olsen & Watts; Michael J. LeStrange

(57) ABSTRACT

A digital clock generation circuit (and a method for operating the same). The digital clock generation circuit includes a first, a second, a third differential comparator circuits. The first differential comparator circuit receives the positive differential clock signal and a reference voltage, and generates a first output signal. The second differential comparator circuit receives the positive and negative differential clock signal, and generates a second output signal. The third differential comparator circuit receives the reference voltage and the negative differential clock signal, and generates a third output signal. A high-high detecting circuit receives the first output signal, and the third output signal, and generates an Enable signal. The digital clock generation circuit further includes a latch circuit which receives the second output signal, and the Enable signal and generates a digital clock signal. The latch circuit comprises a latch with glitch or noise immunity.

18 Claims, 6 Drawing Sheets

RECEIVER CIRCUITS FOR GENERATING DIGITAL CLOCK SIGNALS

BACKGROUND OF THE INVENTION

1. Technical Field

The present invention relates to digital clock generation, and more specifically, to generating a digital clock signal from a Differential Comparator Circuit which correctly handles a special case called the "high-high" condition.

2. Related Art

On a Front Side Bus, there are receiving circuits that convert small signal differential clock signals to a digital clock signal to be used on-chip. The inputs to these circuits are called the Strobe and StrobeN. A condition exists when a transmitting device stops driving the Front Side Bus (called bus change-over) and both Strobe and StrobeN signals are at logic '1'. During this condition, it is advantageous for the on-chip digital clock signal to remain in a well defined logic state despite the state of the signals coming in from the bus. Therefore, there is a need for a clock generation circuit (and a method for operating the same) in which the digital clock signal can be controlled to stay at a defined logic state.

SUMMARY OF THE INVENTION

The present invention provides a clock generation circuit, comprising (a) a first differential comparator circuit, wherein the first differential comparator circuit receives as input (i) a first differential clock signal and (ii) a reference voltage, and generates a first output signal; (b) a second differential comparator circuit, wherein the second differential comparator circuit receives as input (i) the first differential clock signal and (ii) a second differential clock signal, and generates a second output signal, wherein in response to the first and the second differential clock signals switching, the second differential comparator circuit is capable of causing the second output signal to switch logic states; (c) a third differential comparator circuit, wherein the third differential comparator circuit receives as input (i) the reference voltage and (ii) the second differential clock signal, and generates a third output signal; (d) a bus change-over detecting circuit, wherein the bus change-over detecting circuit receives as input (i) the first output signal, and (ii) the third output signal, and generates an Enable signal; and (e) a latch circuit, wherein the latch circuit receives as input (i) the second output signal, and (ii) the Enable signal, wherein the latch circuit generates a digital clock signal, and wherein the latch circuit comprises a latch.

The present invention provides a clock generation method, comprising providing a clock generation circuit which includes (a) a first differential comparator circuit, wherein the first differential comparator circuit receives as input (i) a first differential clock signal and (ii) a reference voltage, and generates a first output signal, (b) a second differential comparator circuit, wherein the second differential comparator circuit receives as input (i) the first differential clock signal and (ii) a second differential clock signal, and generates a second output signal, (c) a third differential comparator circuit, wherein the third differential comparator circuit receives as input (i) the reference voltage and (ii) the second differential clock signal, and generates a third output signal, (d) a bus change-over detecting circuit, wherein the bus change-over detecting circuit receives as input (i) the first output signal, and (ii) the third output signal, and generates an Enable signal, and (e) a latch circuit, wherein the latch circuit receives as input (i) the second output signal, and (ii) the Enable signal, wherein the latch circuit generates a digital clock signal, and wherein the latch circuit comprises a latch; and in response to the first and the second differential clock signals switching, using the second differential comparator circuit to cause the second output signal to switch logic states.

The present invention provides a clock generation circuit, comprising (a) a first differential comparator circuit, wherein the first differential comparator circuit receives as input (i) a first differential clock signal and (ii) a reference voltage, and generates a first output signal; (b) a second differential comparator circuit, wherein the second differential comparator circuit receives as input (i) the first differential clock signal and (ii) a second differential clock signal, and generates a second output signal, wherein in response to the first and the second differential clock signals switching, the second differential comparator circuit is capable of causing the second output signal to switch logic states; (c) a third differential comparator circuit, wherein the third differential comparator circuit receives as input (i) the reference voltage and (ii) the second differential clock signal, and generates a third output signal; (d) a bus change-over detecting circuit, wherein the bus change-over detecting circuit receives as input (i) the first output signal, and (ii) the third output signal, and generates an Enable signal; and (e) a latch circuit, wherein the latch circuit receives as input (i) the second output signal, and (ii) the Enable signal, wherein the latch circuit generates a digital clock signal, and wherein the latch circuit comprises a latch, wherein in response to the first and second differential clock signals not being both higher than the reference voltage, the bus change-over detecting circuit is capable of adjusting the Enable signal resulting in the second output signal passing unchanged through the latch circuit as the digital clock signal, and wherein in response to both the first and second differential clock signals being higher than the reference voltage, the latch circuit is capable of holding the digital clock signal at a previous state.

The present invention provides a digital clock generation circuit that can maintain a well defined logic state during the high-high condition.

DETAILED DESCRIPTION OF THE INVENTION

Figure 1:
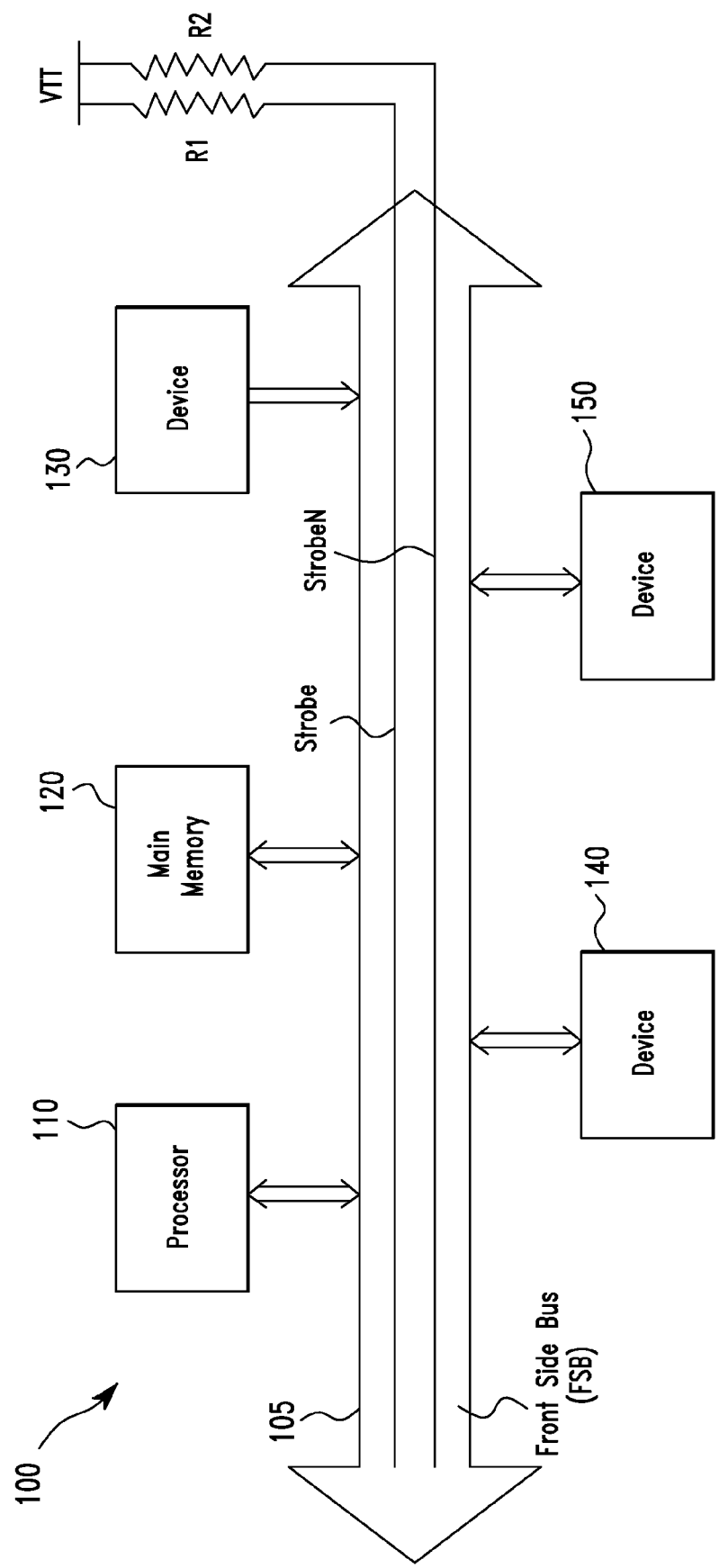
FIG. 1 illustrates a Front Side Bus (FSB), in accordance with embodiments of the present invention.

FIG. 1 illustrates a FSB 100, in accordance with embodiments of the present invention. More specifically, in one embodiment, the FSB 100 comprises a processor 110, a main memory 120, and some devices 130, 140, and 150, all of which are electrically connected together via an FSB (Front Side Bus) 105. In one embodiment, the FSB 105 comprises two lines Strobe and StrobeN which are electrically connected to a termination voltage $V_{TT}$ via two termination resistors $R_1$ and $R_2$, respectively. The two lines Strobe and StrobeN carry a differential clock signal. The two signals Strobe and StrobeN are used to synchronize the transfer of data from a transmitting device of the digital system 100 (e.g., device 130) to one or more receiving device of the digital system 100 (e.g., device 140). It should be noted that, at one time, the device 130 can be a transmitting device and the device 140 can be a receiving device, but at another time, the device 130 can be a receiving device and the device 140 can be a transmitting device.

Figure 2:
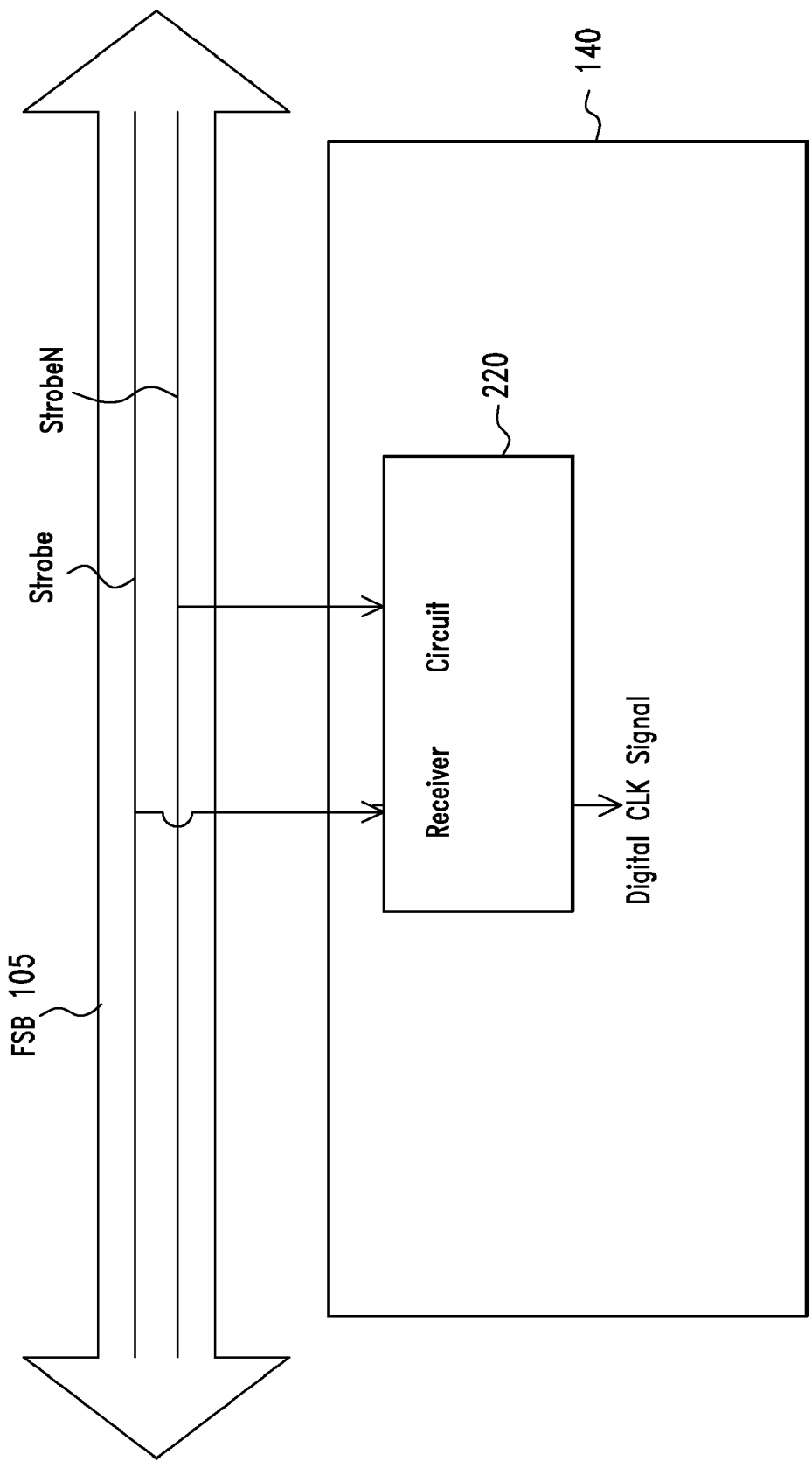
FIG. 2 illustrates a detail configuration of a device connected to a FSB (of FIG. 1), in accordance with embodiments of the present invention.

FIG. 2 illustrates a detail configuration of the device 140 of FIG. 1, in accordance with embodiments of the present invention. In one embodiment, the device 140 comprises a receiver circuit 220 which is electrically connected to the two lines Strobe and StrobeN of the FSB 105. With reference FIG. 1 and FIG. 2, as an example, assume that, at a point of time, the device 140 is receiving data from the device 130 (FIG. 1). In one embodiment, the receiving circuit 220 of the device 140 receives the two signals Strobe and StrobeN from the device 130 via the two lines Strobe and StrobeN of the FSB 105, respectively, and converts the two signals Strobe and StrobeN into a digital clock signal. The digital clock signal is used to synchronize the transfer of data from the transmitting device 130 to the receiving device 140.

Figure 3:
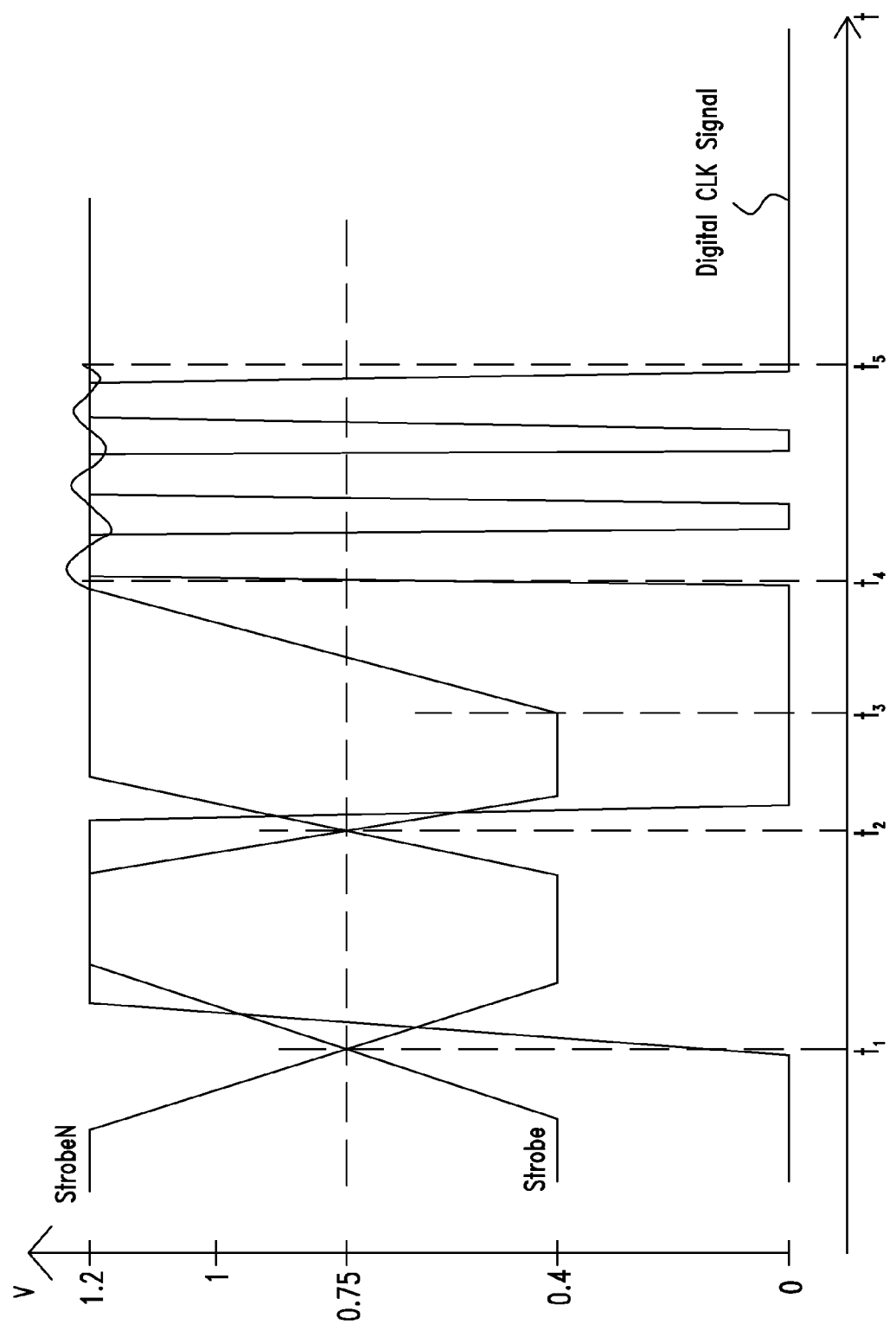
FIG. 3 illustrates the wave forms of the three signals Strobe, StrobeN, and digital clock signal depicting the problem solved by the present invention

FIG. 3 illustrates the wave forms of the three signals Strobe, StrobeN, and digital clock signal in a first embodiment of the present invention. In one embodiment, the digital clock signal switches logic states whenever the difference (in voltage level) between the signal StrobeN and the signal Strobe changes signs. Assume that, in one embodiment, before time $t_1$, when the sign of the difference (in voltage level) between the signal StrobeN and the signal Strobe is positive, the digital clock signal is at logic 0. In one embodiment, at time $t_1$, the two signals Strobe and StrobeN switch; therefore, from time $t_1$ to time $t_2$, the difference (in voltage level) between the signal StrobeN and the signal Strobe changes from positive to negative. As a result, the digital clock signal changes from logic 0 to logic 1 (1.2V). In one embodiment, at time $t_2$, the two signals Strobe and StrobeN switch again; therefore, from time $t_2$ to time $t_3$, the difference (in voltage level) between the signal StrobeN and the signal Strobe changes from negative to positive. As a result, the digital clock signal changes from logic 1 to logic 0. In one embodiment, at time $t_3$, assume that the transmitting device 130 of FIG. 1 stops driving the FSB 105 (called bus change-over). As a result, from time $t_3$ to time $t_4$, the signal StrobeN stays at 1.2V and the signal Strobe rises from 0.4V toward $V_{CC}$ (1.2V) (because both the two signals Strobe and StrobeN terminate at $V_{TT}$). Therefore, during this time period (i.e., from time $t_3$ to time $t_4$), the difference (in voltage level) between the signal Strobe and the signal StrobeN remain at positive. As a result, the digital clock signal remains at logic 0. In one embodiment, from the time $t_4$ to time $t_5$, the signal StrobeN stays at 1.2V and the signal Strobe oscillates around 1.2V. As a result, the digital clock signal oscillates between logic 0 and logic 1. In one embodiment, after time $t_5$, when the two signals Strobe and StrobeN stay at 1.2V, the digital clock signal stays at logic 0.

Figure 4:
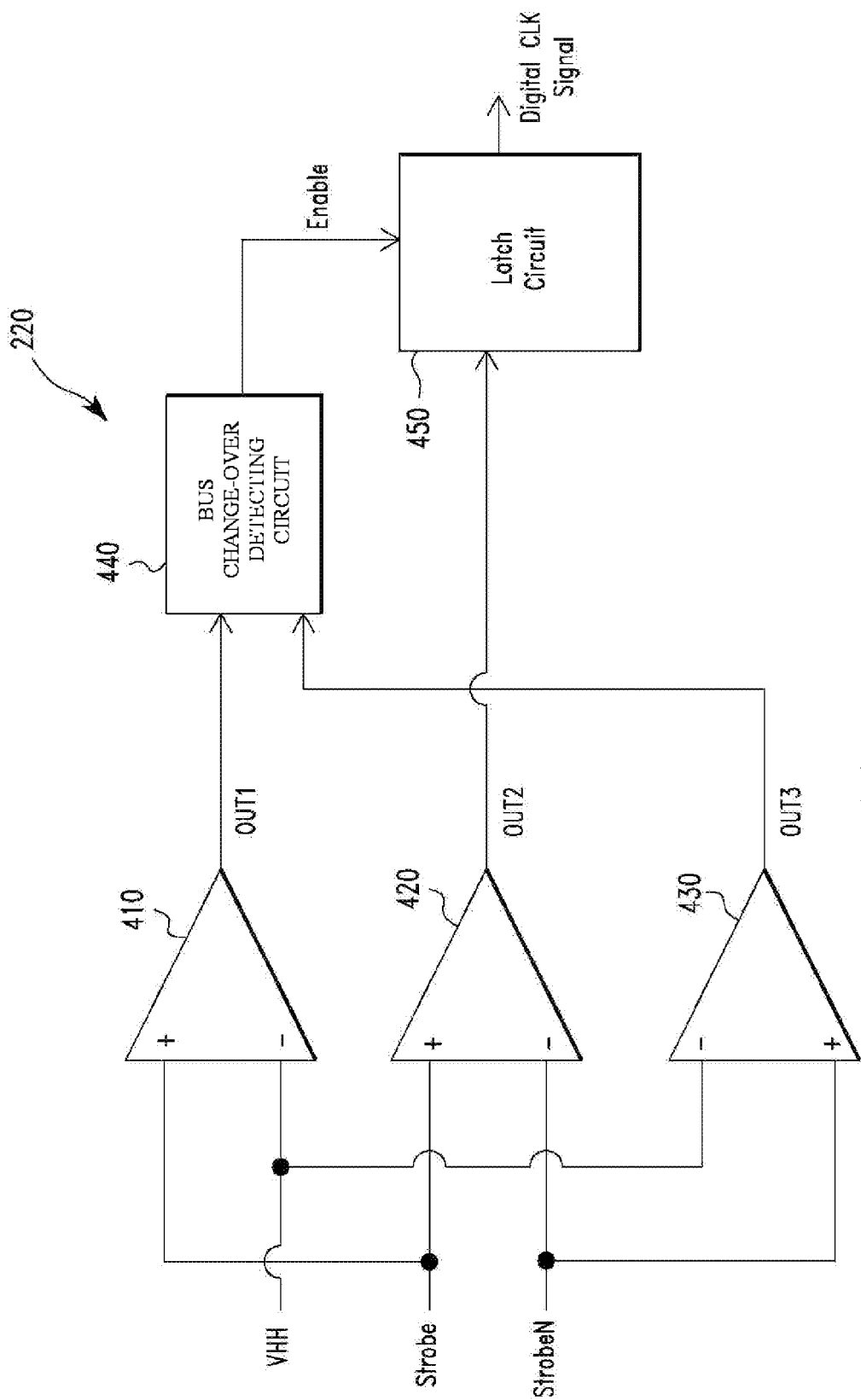
FIG. 4 illustrates a detail configuration of a receiver circuit of FIG. 2, in accordance with embodiments of the present invention.

FIG. 4 illustrates a detail configuration of the receiver circuit 220 of FIG. 2, in accordance with embodiments of the present invention. More specifically, the receiver circuit 220 comprises three differential comparators 410, 420, and 430, a bus change-over detecting circuit 440, and a latch circuit 450. More specifically, in one embodiment, the differential comparator 410 receives as inputs the signal Strobe and a reference voltage $V_{HH}$ and generates a signal OUT1. In one embodiment, the voltage level of the reference voltage $V_{HH}$ is 1V. In one embodiment, the differential comparator 420 receives as inputs the two signals Strobe and StrobeN and generates a signal OUT2 whereas the differential comparator 430 receives as inputs the two signals StrobeN and the reference voltage $V_{HH}$ and generates a signal OUT3. In one embodiment, the bus change-over detecting circuit 440 receives as inputs the two signals OUT1 and OUT3 and generates a signal Enable to the latch circuit 450. In one embodiment, the latch circuit 450 receives as input the signal OUT2 and generates the digital clock signal. The latch circuit 450 also receives the signal Enable from the bus change-over detecting circuit 440.

Figure 5:
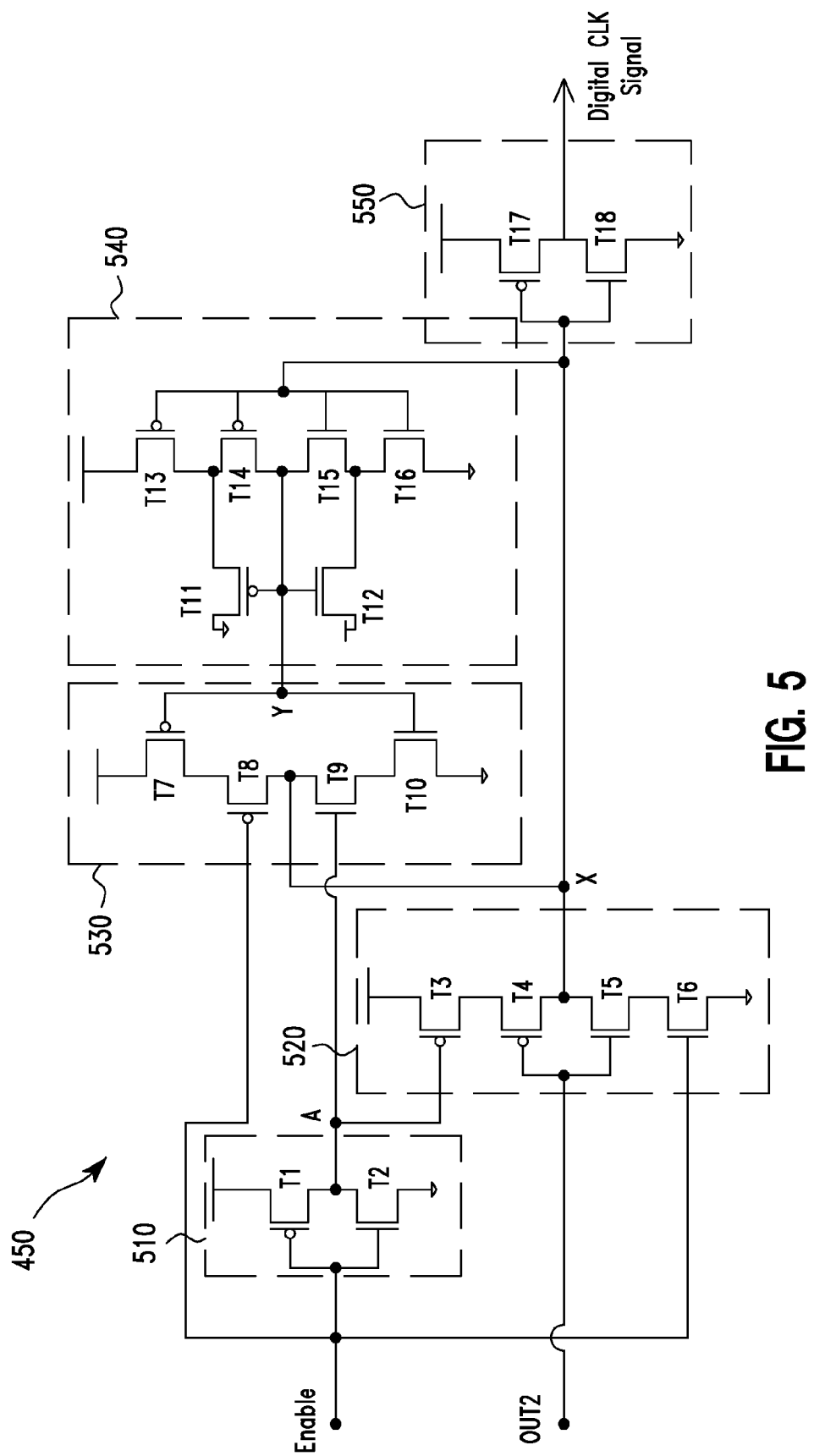
FIG. 5 illustrates a detail configuration of a latch circuit of FIG. 3, in accordance with embodiments of the present invention.

FIG. 5 illustrates a detail configuration of the latch circuit 450 of FIG. 3, in accordance with embodiments of the present invention. More specifically, the latch circuit 450 comprises four inverters 510, 520, 530, and 550 and a Glitch Immunity circuit 540. It should be noted that the Glitch Immunity circuit 540 is also an inverter. The two inverters 530 and 540 are cross connected and therefore they form a latch (hence the name the latch circuit 450).

In one embodiment, the inverter 510 comprises a p-channel transistor T1 and an n-channel transistor T2 electrically connected in series between Vcc and Ground. In one embodiment, the inverter 520 comprises two p-channel transistors T3 and T4 and two n-channel transistors T5 and T6. Illustratively, four transistors T3, T4, T5 and T6 are electrically connected in series between Vcc and Ground. In one embodiment, the inverter 530 comprises two p-channel transistors T7 and T8 and two n-channel transistors T9 and T10. Illustratively, four transistors T7, T8, T9 and T10 are electrically connected in series between Vcc and Ground. In one embodiment, the inverter 550 comprises a p-channel transistor T17 and an n-channel transistor T18. Illustratively, two transistors T17 and T18 are electrically connected in series between Vcc and Ground. In one embodiment, the Glitch Immunity 540 comprises three p-channel transistors T11, T13, and T14, and three n-channel transistors T12, T15 and T16. Illustratively, four transistors T13, T14, T15 and T16 are electrically connected in series between Vcc and Ground.

In one embodiment, the inverter 510 receives as input the Enable signal and sends a first digital signal to node A. The inverter 520 receives as input the signal OUT2 and sends a second digital signal to node X. The transistor T3 receives the first digital signal from node A. The Glitch Immunity 540 receives as input the second digital signal from node X and sends a third digital signal to node Y. The inverter 530 receives as input the third digital signal from node Y and sends the second digital signal to node X. The transistor T8 receives as input the Enable signal. The inverter 550 receives as input the second digital signal and generates the digital clock signal.

Figure 6:
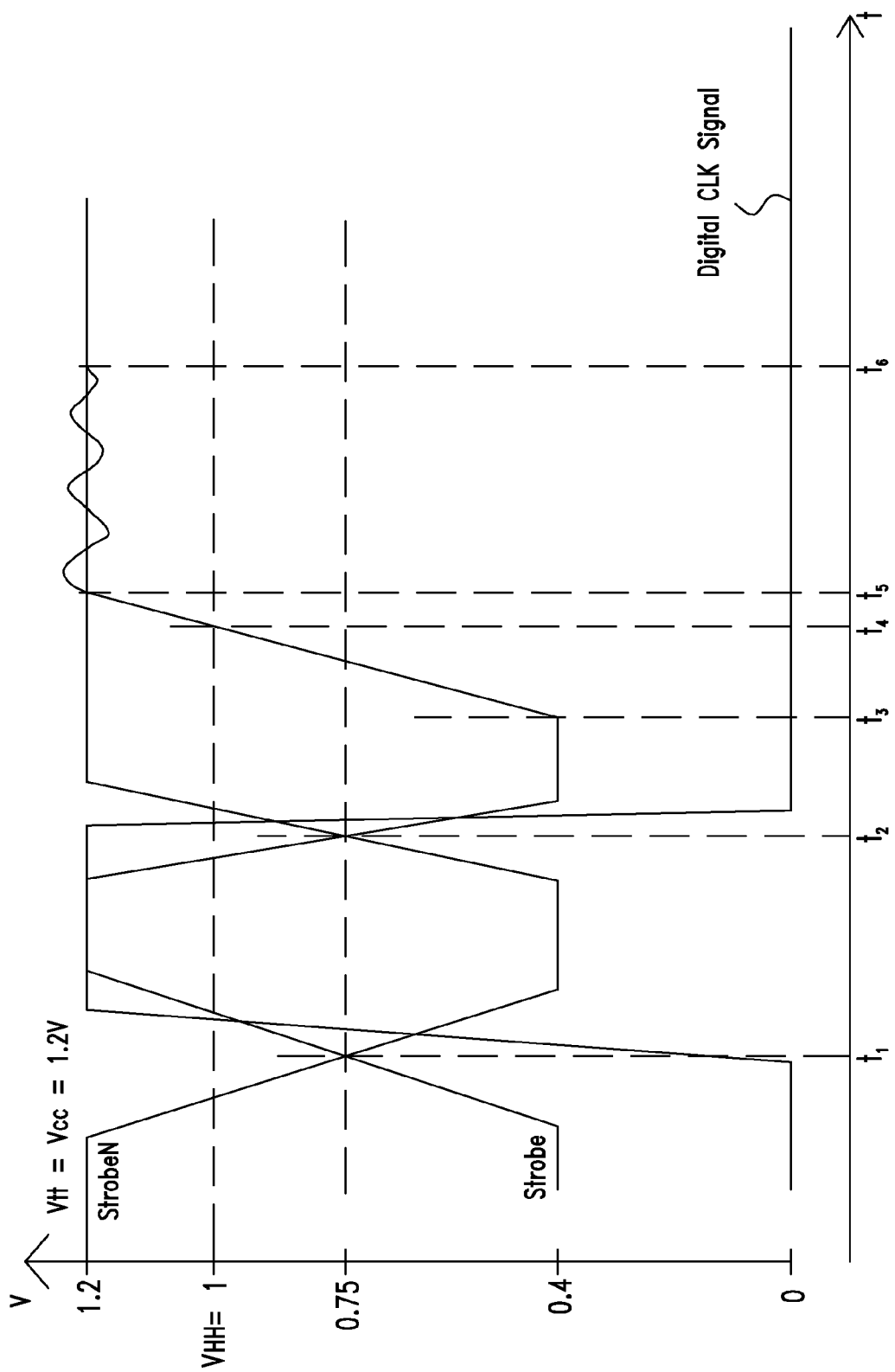
FIG. 6 illustrates the wave forms of the three signals Strobe, StrobeN, and the digital clock signal of FIGS. 2, 4, and 5 in a second embodiment of the present invention

FIG. 6 illustrates the wave forms of the three signals Strobe, StrobeN, and the digital clock signal of FIGS. 2, 4, and 5 in a second embodiment of the present invention, in which the transmitting device 130 of the digital system 100 of FIG. 1 is sending data to the receiving device 140 of the digital system 100.

In one embodiment, the operation of the bus change-over detecting circuit 440 of the FIG. 4 is as follows. Only in case of both the two signals OUT1 and OUT3 being at logic 1, the bus change-over detecting circuit 440 generates the Enable signal at logic 0. Otherwise, the bus change-over detecting circuit 440 generates the Enable signal at logic 1. In one embodiment, the bus change-over detecting circuit 440 is a NAND gate. As can be seen in FIG. 6, before time $t_4$, the two signals Strobe and StrobeN are not both higher (in voltage level) than $V_{HH}$. Therefore, the two signals OUT1 and OUT3 are not both at logic 1. As a result, the bus change-over detecting circuit 440 generates the Enable signal at logic 1. After time $t_4$, both the two signals Strobe and StrobeN are higher (in voltage level) than $V_{HH}$. Therefore, both the two signals OUT1 and OUT3 are at logic 1, and as a result, the bus change-over detecting circuit 440 generates the Enable signal at logic 0.

With reference to FIGS. 2, 4, 5 and 6, in one embodiment, the operation of the receiver circuit 220 is as follows. As can be seen in FIG. 6, before time $t_1$, the signal StrobeN is higher (in voltage level) than the signal Strobe. As a result, the signal OUT2 of the differential comparator 420 of FIG. 4 is at logic 0. During this time period (i.e., before time $t_1$), the Enable signal is at logic 1. As a result, the latch circuit 450 of FIG. 4 allows the signal OUT2 to pass through it unchanged. Therefore, the digital clock signal is the same of the OUT2 signal. More specifically, the inverter 520 of the latch circuit 450 inverts the digital signal OUT2 into the second digital signal at node X and then the inverter 550 the latch circuit 450 inverts the second digital signal at node X to the digital clock signal. In other words, the digital clock signal is the same of the OUT2 signal, which is at logic 0.

In one embodiment, as can be seen in FIG. 6, from time $t_1$ to time $t_2$, the signal StrobeN is lower (in voltage level) than the signal Strobe. As a result, the signal OUT2 of the differential comparator 420 of FIG. 4 is at logic 1. During this time period (e.g., before time $t_4$), the Enable signal is at logic 1. As a result, the latch circuit 450 of FIG. 4 allows the signal OUT2 to pass through it unchanged. Therefore, the digital clock signal is the same of the OUT2 signal. More specifically, the inverter 520 of the latch circuit 450 inverts the digital signal OUT2 into the second digital signal at node X and then the inverter 550 the latch circuit 450 inverts the second digital signal at node X to the digital clock signal. In other words, the digital clock signal is the same of the OUT2 signal, which is at logic 1.

In one embodiment, as can be seen in FIG. 6, from time $t_2$ to time $t_3$, the signal StrobeN is higher (in voltage level) than the signal Strobe. As a result, the signal OUT2 of the differential comparator 420 of FIG. 4 is at logic 0. During this time period (e.g., before time $t_4$), the Enable signal is at logic 1. As a result, the latch circuit 450 of FIG. 4 allows the signal OUT2 to pass through it unchanged. Therefore, the digital clock signal is the same of the OUT2 signal. More specifically, the inverter 520 of the latch circuit 450 inverts the digital signal OUT2 into the second digital signal at node X and then the inverter 550 the latch circuit 450 inverts the second digital signal at node X to the digital clock signal. In other words, the digital clock signal is the same of the OUT2 signal, which is at logic 0.

In one embodiment, as can be seen in FIG. 6, at time $t_3$, the transmitting device 130 stops driving the FSB 105. As a result, the signal StrobeN stays at $V_{TT}$ and the signal Strobe rises from 0.4V toward $V_{TT}$. From time $t_3$ to time $t_4$, the signal StrobeN is higher (in voltage level) than the signal Strobe. As a result, the signal OUT2 of the differential comparator 420 is at logic 0. During this time period (from time $t_3$ to time t4, which is before time $t_4$), the Enable signal is at logic 1. As a result, the latch circuit 450 of FIG. 4 allows the signal OUT2 to pass through it unchanged. More specifically, the inverter 520 of the latch circuit 450 inverts the digital signal OUT2 into the digital signal at node X and then the inverter 550 the latch circuit 450 inverts the digital signal at node X to the digital clock signal. In other words, the digital clock signal is the same of the OUT2 signal, which is at logic 0.

In one embodiment, as can be seen in FIG. 6, after time $t_4$, the bus change-over detecting circuit 440 of the FIG. 4 generates the Enable signal at logic 0. As a result, the latch circuit 450 of FIG. 4 is in a hold mode. In other words, the latch circuit 450 holds the digital clock signal at the logic state at the time when the latch circuit 450 enters the hold mode. It should be noted that, due to the delay of the bus change-over detecting circuit 440, the latch circuit 450 may enter the hold mode sometime after time $t_5$. This means that, after time $t_5$, the oscillation of signal OUT2, caused by the signal Strobe oscillating around $V_{TT}$, may arrive at the latch circuit 450 before the latch circuit 450 enters the hold mode. Even so, the Glitch Immunity circuit 540 prevents the digital signal at node X from oscillating in response to the oscillation of the signal OUT2. As a result, after time $t_5$, when the latch circuit 450 enters the hold mode the digital clock signal is unchanged (i.e., stays at logic 0).

In one embodiment, the operation of the Glitch Immunity circuit 540 is as follows (Schmitt Trigger Functionality). Suppose initially, node X='0' and node Y='1'. As node X begins to transition from '0' to '1', transistors T15/T16 start to turn on and transistors T13/T14 start to turn off. T12 is on because Y='1' so T12 tries to hold node Y at logic 1 contending with transistors T15/T16 which are trying to pull node Y to 'logic 0. Eventually, when node X rises high enough that transistors T15/T16 over-power T12, node Y transitions to logic 0. The same operation holds for the falling edge of node X but transistors T13/T14 and T11 come into play.

In comparison between the second embodiment of the present invention (FIG. 6) and the first second embodiment of the present invention (FIG. 3), it can be seen that, in the second embodiment, after the transmitting device 130 stops driving the FSB 105 (i.e., after time $t_3$), there is no oscillation in the digital clock signal.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A clock generation circuit, comprising:
   (a) a first differential comparator circuit,
      wherein the first differential comparator circuit receives as input (i) a first differential clock signal and (ii) a reference voltage, and generates a first output signal;
   (b) a second differential comparator circuit,
      wherein the second differential comparator circuit receives as input (i) the first differential clock signal and (ii) a second differential clock signal, and generates a second output signal,
      wherein in response to the first and the second differential clock signals switching, the second differential comparator circuit is capable of causing the second output signal to switch logic states;
   (c) a third differential comparator circuit, wherein the third differential comparator circuit receives as input (i) the reference voltage and (ii) the second differential clock signal, and generates a third output signal;

(d) a bus change-over detecting circuit,
wherein the bus change-over detecting circuit receives as input (i) the first output signal, and (ii) the third output signal, and generates an Enable signal; and (e) a latch circuit,
wherein the latch circuit receives as input (i) the second output signal, and (ii) the Enable signal,
wherein the latch circuit generates a digital clock signal, and
wherein the latch circuit comprises a latch, and
wherein in response to a high-high condition that both the first and second differential clock signals are higher than the reference voltage becoming true, the latch circuit is configured to hold the digital clock signal at a previous state which was generated by the latch circuit immediately before the high-high condition becomes true.

2. The clock generation circuit of claim 1,
wherein the bus change-over detecting circuit comprises a NAND gate.

3. The clock generation circuit of claim 1,
wherein in response to the first and second differential clock signals not being both higher than the reference voltage, the bus change-over detecting circuit is capable of adjusting the Enable signal resulting in the second output signal passing unchanged through the latch circuit as the digital clock signal.

4. A clock generation circuit, comprising:
(a) a first differential comparator circuit,
wherein the first differential comparator circuit receives as input (i) a first differential clock signal and (ii) a reference voltage, and generates a first output signal;

(b) a second differential comparator circuit,
wherein the second differential comparator circuit receives as input (i) the first differential clock signal and (ii) a second differential clock signal, and generates a second output signal,
wherein in response to the first and the second differential clock signals switching, the second differential comparator circuit is capable of causing the second output signal to switch logic states;

(c) a third differential comparator circuit,
wherein the third differential comparator circuit receives as input (i) the reference voltage and (ii) the second differential clock signal, and generates a third output signal;

(d) a bus change-over detecting circuit,
wherein the bus change-over detecting circuit receives as input (i) the first output signal, and (ii) the third output signal, and generates an Enable signal; and (e) a latch circuit,
wherein the latch circuit receives as input (i) the second output signal, and (ii) the Enable signal,
wherein the latch circuit generates a digital clock signal,
wherein the latch circuit comprises a latch,
wherein the latch comprises a first inverter and a second inverter,
wherein the first inverter and the second inverter are cross coupled,
wherein the second inverter comprises a Glitch Immunity circuit, and
wherein the first inverter generates a fourth output signal.

5. The clock generation circuit of claim 4,
wherein the latch circuit further comprises a third inverter and a fourth inverter coupled in series,
wherein the third inverter receives as input the second output signal, and generates the fourth output signal,
wherein the fourth inverter receives as input the fourth output signal, and generates the digital clock signal, and
wherein the latch receives as input the fourth output signal.

6. A clock generation circuit, comprising:
(a) a first differential comparator circuit,
wherein the first differential comparator circuit receives as input (i) a first differential clock signal and (ii) a reference voltage, and generates a first output signal;

(b) a second differential comparator circuit,
wherein the second differential comparator circuit receives as input (i) the first differential clock signal and (ii) a second differential clock signal, and generates a second output signal,
wherein in response to the first and the second differential clock signals switching, the second differential comparator circuit is capable of causing the second output signal to switch logic states;

(c) a third differential comparator circuit,
wherein the third differential comparator circuit receives as input (i) the reference voltage and (ii) the second differential clock signal, and generates a third output signal;

(d) a bus change-over detecting circuit,
wherein the bus change-over detecting circuit receives as input (i) the first output signal, and (ii) the third output signal, and generates an Enable signal; and (e) a latch circuit,
wherein the latch circuit receives as input (i) the second output signal, and (ii) the Enable signal,
wherein the latch circuit generates a digital clock signal,
wherein the latch circuit comprises a latch,
wherein the latch circuit further comprises a third inverter and a fourth inverter coupled in series,
wherein the third inverter receives as input the second output signal, and generates a fifth output signal,
wherein the fourth inverter receives as input the fifth output signal, and generates the digital clock signal, and
wherein the latch receives as input the fifth output signal.

7. The clock generation circuit of claim 6,
wherein the latch circuit further comprises a fifth inverter,
wherein the fifth inverter receives as input the Enable signal, and
wherein the fifth inverter comprises an output node electrically coupled to the third inverter.

8. A clock generation method, comprising:
forming a clock generation circuit which includes:
(a) a first differential comparator circuit,
wherein the first differential comparator circuit receives as input (i) a first differential clock signal and (ii) a reference voltage, and generates a first output signal,
(b) a second differential comparator circuit,
wherein the second differential comparator circuit receives as input (i) the first differential clock signal and (ii) a second differential clock signal, and generates a second output signal, (c) a third differential comparator circuit,
  wherein the third differential comparator circuit receives as input (i) the reference voltage and (ii) the second differential clock signal, and generates a third output signal,
(d) a bus change-over detecting circuit,
  wherein the bus change-over detecting circuit receives as input (i) the first output signal, and (ii) the third output signal, and generates an Enable signal, and
(e) a latch circuit,
  wherein the latch circuit receives as input (i) the second output signal, and (ii) the Enable signal,
  wherein the latch circuit generates a digital clock signal, and
  wherein the latch circuit comprises a latch;
in response to the first and the second differential clock signals switching, using the second differential comparator circuit to cause the second output signal to switch logic states; and
wherein in response to a high-high condition that both the first and second differential clock signals are higher than the reference voltage becoming true using the latch circuit to hold the digital clock signal at a previous state which was generated by the latch circuit immediately before the high-high condition becomes true.

9. The clock generation method of claim 8,
further comprising, in response to the first and second differential clock signals not being both higher than the reference voltage, using the bus change-over detecting circuit to adjust the Enable signal resulting in the second output signal passing unchanged through the latch circuit as the digital clock signal.

10. The clock generation method of claim 8,
wherein the bus change-over detecting circuit comprises a NAND gate.

11. The clock generation method of claim 8,
wherein the latch comprises a first inverter and a second inverter,
wherein the first inverter and the second inverter are cross coupled,
wherein the second inverter comprises a Glitch Immunity circuit, and
wherein the first inverter generates a fourth output signal.

12. The clock generation method of claim 11,
wherein the latch circuit further comprises a third inverter and a fourth inverter coupled in series,
wherein the third inverter receives as input the second output signal, and generates the fourth output signal,
wherein the fourth inverter receives as input the fourth output signal, and generates the digital clock signal, and
wherein the latch receives as input the fourth output signal.

13. The clock generation method of claim 8,
wherein the latch circuit further comprises a third inverter and a fourth inverter coupled in series,
wherein the third inverter receives as input the second output signal, and generates a fifth output signal,
wherein the fourth inverter receives as input the fifth output signal, and generates the digital clock signal, and
wherein the latch receives as input the fifth output signal.

14. The clock generation method of claim 13,
wherein the latch circuit further comprises a fifth inverter,
wherein the fifth inverter receives as input the Enable signal, and
wherein the fifth inverter comprises an output node electrically coupled to the third inverter.

15. A clock generation circuit, comprising:
(a) a first differential comparator circuit,
  wherein the first differential comparator circuit receives as input (i) a first differential clock signal and (ii) a reference voltage, and generates a first output signal;
(b) a second differential comparator circuit,
  wherein the second differential comparator circuit receives as input (i) the first differential clock signal and (ii) a second differential clock signal, and generates a second output signal,
  wherein in response to the first and the second differential clock signals switching, the second differential comparator circuit is capable of causing the second output signal to switch logic states;
(c) a third differential comparator circuit,
  wherein the third differential comparator circuit receives as input (i) the reference voltage and (ii) the second differential clock signal, and generates a third output signal;
(d) a bus change-over detecting circuit,
  wherein the bus change-over detecting circuit receives as input (i) the first output signal, and (ii) the third output signal, and generates an Enable signal; and
(e) a latch circuit,
  wherein the latch circuit receives as input (i) the second output signal, and (ii) the Enable signal,
  wherein the latch circuit generates a digital clock signal, and
  wherein the latch circuit comprises a latch,
wherein in response to the first and second differential clock signals not being both higher than the reference voltage, the bus change-over detecting circuit is capable of adjusting the Enable signal resulting in the second output signal passing unchanged through the latch circuit as the digital clock signal, and
wherein in response to both the first and second differential clock signals being higher than the reference voltage, the latch circuit is capable of holding the digital clock signal at a previous state.

16. The clock generation circuit of claim 15,
wherein the bus change-over detecting circuit comprises a NAND gate,
wherein the latch comprises a first inverter and a second inverter,
wherein the first inverter and the second inverter are cross coupled,
wherein the second inverter comprises a Glitch Immunity circuit, and
wherein the first inverter generates a fourth output signal.

17. The clock generation circuit of claim 15,
wherein the latch circuit further comprises a third inverter and a fourth inverter coupled in series,
wherein the third inverter receives as input the second output signal, and generates a fifth output signal,
wherein the fourth inverter receives as input the fifth output signal, and generates the digital clock signal,
wherein the latch receives as input the fifth output signal,
wherein the latch circuit further comprises a fifth inverter,
wherein the fifth inverter receives as input the Enable signal, and
wherein the fifth inverter comprises an output node electrically coupled to the third inverter.

18. The clock generation circuit of claim 15,
wherein the latch circuit further comprises a third inverter and a fourth inverter coupled in series,
wherein the third inverter receives as input the second output signal, and generates the fifth output signal,
wherein the fourth inverter receives as input the fifth output signal, and generates the digital clock signal, wherein the latch receives as input the fifth output signal, wherein the latch circuit further comprises a third inverter and a fourth inverter coupled in series, wherein the third inverter receives as input the second output signal, and generates the fourth output signal, wherein the fourth inverter receives as input the fourth output signal, and generates the digital clock signal, and wherein the latch receives as input the fourth output signal.

* * * * *